W. T. SHAW & G. W. MENZ.
Steaming-Table and Heating-Oven Combined.

No. 200,094. Patented Feb. 5, 1878.

WITNESSES.
Frank Pardon.
C. Hewitt

INVENTOR.
William T. Shaw
George W. Menz
by J. S. Hewitt
Attorney

UNITED STATES PATENT OFFICE.

WILLIAM T. SHAW AND GEORGE W. MENZ, OF LOUISVILLE, KENTUCKY.

IMPROVEMENT IN STEAMING-TABLE AND HEATING-OVEN COMBINED.

Specification forming part of Letters Patent No. 200,094, dated February 5, 1878; application filed October 29, 1877.

*To all whom it may concern:*

Be it known that we, WILLIAM T. SHAW and GEORGE W. MENZ, of the city of Louisville, in the county of Jefferson and State of Kentucky, have invented a certain new and useful Improvement in Steam-Table and Heating-Oven Combined; and we do hereby declare that the following is a full, clear, and exact description thereof, which will enable others skilled in the art to which it appertains to make and use the same, reference being had to the accompanying drawings, which form part of this specification, and in which—

Figure 1:
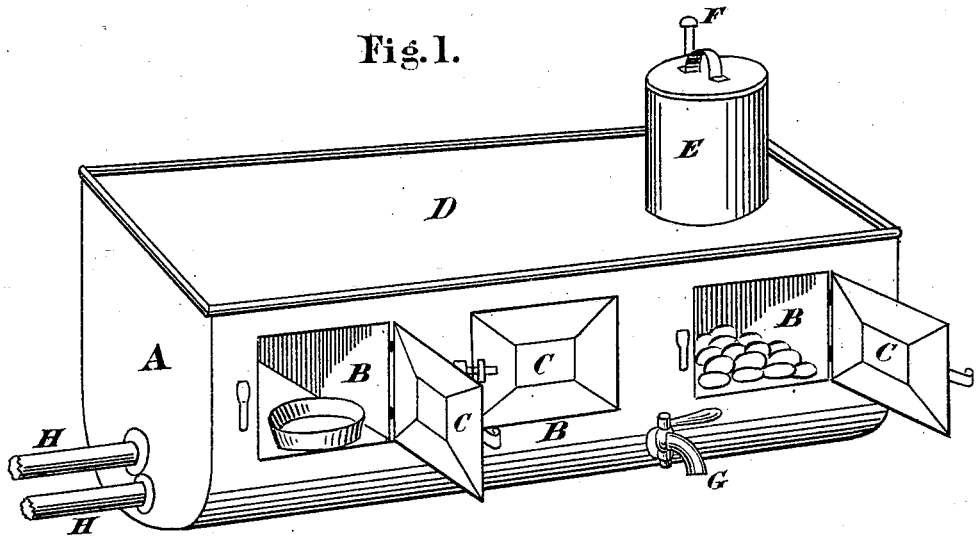
Figure 2:
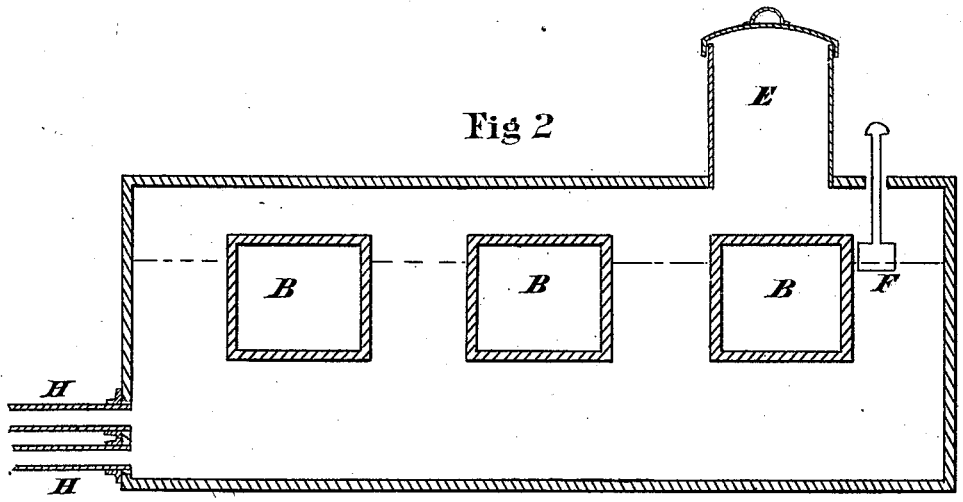

Figure 1 is a perspective view of the table, showing its general construction; and Fig. 2, a sectional view, showing the interior of the water-tank and ovens.

Similar letters of reference indicate corresponding parts of the drawings.

This our invention relates to a new and useful improvement in steam-tables with oven and water-tank combined, for the use of hotels, restaurants, &c.

The invention consists in a tank made of metal, with semicircular bottom, straight sides, and flat top, and provided with heating-ovens in the side below the water-level; the object of which is to keep bread, meat, and other articles warm and in good condition until wanted, without being dried or hardened, as if kept in an oven heated by fire to a temperature above the boiling-point. These ovens may also be used for cooking fruit and other tender articles.

The top may be used in cases where heat only is required to keep the articles warm.

A is the tank, which is made of metal, and in form as shown in the drawings. B B B are the ovens, which consist of simple boxes inserted in the side of the tank—not extending through the back, but inclosed in front by the doors C C C. D is the table, and E the covered chamber, used as a convenience in filling the tank and examining the state of the water inside. F is a float, used for determining the height of the water without opening the chamber to ascertain it. G is a faucet, from which hot water may be drawn when required. H H are the pipes connecting the tank with the water-box in the stove, by means of which water in the tank is heated, and a constant circulation is kept up between it and the fire-box of the stove.

Any ordinary cooking-stove with suitable fire-box may be used.

Having thus fully described the nature and object of this our invention, we claim as new and desire to secure by Letters Patent—

In a steam-table, a combined steaming-table and heating-oven, consisting of the water-tank A, having the flat top D, in combination with the ovens B, arranged in said tank substantially in the manner described.

WILLIAM T. SHAW.
GEORGE W. MENZ.

Witnesses:
FRANK PARDON,
C. HEWITT.